(12) United States Patent
Ealey (10) Patent No.: US 8,360,856 B2
(45) Date of Patent: Jan. 29, 2013

(54) ENTERTAINMENT APPARATUS AND METHOD

(75) Inventor: Douglas Ralph Ealey, Hampshire (GB)

(73) Assignee: Sony Computer Entertainment Europe Limited (GB)

( * ) Notice: Subject to any disclaimer, the term of this patent is extended or adjusted under 35 U.S.C. 154(b) by 232 days.

(21) Appl. No.: 12/676,170

(22) PCT Filed: Sep. 3, 2008

(86) PCT No.: PCT/GB2008/002978
§ 371 (c)(1),
(2), (4) Date: Apr. 12, 2010

(87) PCT Pub. No.: WO2009/030897
PCT Pub. Date: Mar. 12, 2009

(65) Prior Publication Data
US 2010/0203971 A1    Aug. 12, 2010

(30) Foreign Application Priority Data
Sep. 6, 2007    (GB) .................................... 0717330.5

(51) Int. Cl.
*G06F 17/00* (2006.01)
(52) U.S. Cl. ................ 463/24; 463/23; 463/42; 463/43; 273/108.1; 273/317.1; 345/473; 715/229; 717/122; 717/170
(58) Field of Classification Search .................. 463/2–8, 463/23, 30–32, 34, 37, 42–45, 50, 24; 273/108.1, 273/108.3, 108.4, 118 A, 119 A, 122 A, 123 A, 273/125 A, 126 A, 138.2, 141 A, 142 JB, 273/273, 317.1, 317.3, 317.4, 317.5, 317.6; 324/207.21, 235, 252; 345/156–158, 167, 345/473–474, 557, 664, 679; 360/313–319, 360/324–327; 365/8, 158, 226; 707/203; 710/300; 711/3, 123, 125–126, 129–132, 135, 138–140, 144; 715/229, 856, FOR. 221; 717/122, 170; *G06F 17/00*
See application file for complete search history.

(56) References Cited

U.S. PATENT DOCUMENTS
6,510,502 B1 * 1/2003 Shimizu .......................... 711/164
7,111,249 B2 * 9/2006 Kenyon ........................ 715/825
(Continued)

FOREIGN PATENT DOCUMENTS
EP    1475756 A2    11/2004
EP    1569093 A2    8/2005

OTHER PUBLICATIONS
Office Action from EP Application No. 08788517 dated Aug. 13, 2010.
(Continued)

*Primary Examiner* — Arthur O. Hall
(74) *Attorney, Agent, or Firm* — Lerner, David, Littenberg, Krumholz & Mentlik, LLP (57) ABSTRACT

An entertainment device comprises communication means for communicating with a remote device over a network; program code and resources for running a full version of the program, the program code being operable to interact with remote devices also running a full version of the program; and program resource classification means, and in which when communication with a remote device indicates that the remote device is running a demonstration version of the program code; the program code on the entertainment device restricts the use of program resources to those identified by the program resource classification means as being available to or compatible with the demonstration version of the program, thereby restricting the full version of the program to operate substantially as a demo version of the program for the purposes of interaction with a demo version of the program being run on the remote device.

35 Claims, 7 Drawing Sheets

U.S. PATENT DOCUMENTS

| | | |
|---|---|---|
| 7,237,239 B1 | 6/2007 | Goel et al. |
| 7,455,590 B2 * | 11/2008 | Hansen et al. ............... 463/40 |
| 2002/0133805 A1 | 9/2002 | Pugh et al. |
| 2003/0093639 A1 * | 5/2003 | Shimizu ............... 711/164 |
| 2005/0033767 A1 | 2/2005 | Kamentz et al. |
| 2005/0055309 A1 * | 3/2005 | Williams et al. ............ 705/40 |
| 2005/0177826 A1 * | 8/2005 | Miller et al. ............... 717/170 |
| 2007/0105627 A1 * | 5/2007 | Campbell ............... 463/40 |
| 2008/0282353 A1 * | 11/2008 | Kamperman et al. ......... 726/26 |

OTHER PUBLICATIONS

Search Report and Examination Report from corresponding GB Application No. 0717330.5, dated Dec. 21, 2007.

International Search Report, PCT/GB2008/002978, dated Apr. 14, 2009.

New UT2004 Demo released: Sep. 24, 2004 http://forumns.epicgames.com/showthread.php?t=414243&highlight=demo+full+server.

Demo and UT2004 ECE online play—Apr. 11, 2005 <http://forums.epicgames.com/showthread.php?t=501180&highlight=demo+full+server>.

Why do owners play on demo servers? Apr. 15, 2007 http://forums.epicgames.conn/showthread.php?t=568301&highlight=demo+full+server.

* cited by examiner

ENTERTAINMENT APPARATUS AND METHOD

CROSS REFERENCE TO RELATED APPLICATIONS

The present application is a national phase entry under 35 U.S.C. §371 of International Application No. PCT/GB2008/002978, filed Sep. 3, 2008, published in English, which claims the benefit of GB Patent Application No. 0717330.5, filed Sep. 6, 2007. The entire disclosures of each of the above-identified applications are incorporated by reference herein.

The present invention relates to an entertainment apparatus and method.

It is commonplace that prospective users of software wish to try the software out before buying it, to determine for example whether it performs a desired function, is compatible with other software, will run on their configuration of computer or (particularly in the case of games) is enjoyable to use.

Consequently distribution models for software have arisen that allow the user to initially try out software for free before making a purchase. These distribution models can be classified as being 'full code' or 'partial code' distributions, which satisfy different markets.

Full code distributions generally take the form of so-called 'nagware' and 'shareware' schemes.

Nagware generally provides the full code (in the sense that all commonly required functionality is provided in an unrestricted fashion), but also adds an inconvenience such as a reminder screen or an initial dialog box inviting the user to buy an upgrade that either adds optional features or simply removes the reminder. Such a distribution model is typical of applications for which dominance in market share is vital to the business model, such as for example WinZip (http://www.winzip.com/) or RealPlayer (http://uk.real.com/player/).

Shareware also generally provides the full program code, but limits its use in some fashion—for example, the program may be fully operational but only work for a certain number of days, or for a certain number of uses. Alternatively, the full program may not be time-limited, but some important features are disabled, such as saving program outputs. Shareware is typically used by small vendors with limited means of distribution, such as for example via downloads from a web page.

Typically the nagging message or time-limit are removed, or the key features are unlocked, by payment to the vendor in return for an activation key code that is entered into the program via a user interface, or added to the operating system registry.

However, both nagware and shareware are comparatively easy to hack so as to restore them to an unrestricted form, as all the software required is potentially available. For most small vendors the likelihood of a widespread hack is fairly small. For larger vendors, nagware and shareware distributions attempt to counter hackers by frequent incremental releases, by changing registry keys, and by requiring on-line registration of the user. Whilst these measures may discourage hackers, they are also inconvenient to users.

By contrast, for high-profile software such as games, where in general there are no incremental releases and the likelihood of hacking attempts are high, the prospect of distributing the full game code for free and then trying to recoup payments later through the above methods is unappealing.

Indeed, software that is likely to be targeted for piracy typically employs countermeasures that militate against the above distribution models. For example, most games require the physical presence of the install disk in order to play, and require that a unique code associated with that specific disk is entered during the installation process, to make the instance of the game uniquely identifiable. Often the install disks are also manufactured so as to make any form of duplication difficult.

In addition, games vendors generally release demonstration versions of their games that only comprise partial code. Such code typically comprises the full game engine (the graphical rendering system and user interface), but only comprises a small percentage of the full game's content (i.e. the environment that is rendered by the game engine and actually constitutes the game).

In this way, prospective buyers can evaluate a small portion of the full game, whilst the software vendors can be sure that the full game cannot be extracted from the demo by hackers, because it does not comprise the full game code.

As a result the demo version of a game can be circulated freely, whilst the full retail version of the game can implement any desired anti-piracy measures, such as those outlined above. Consequently, upon initial release of the retail version of a game it is likely that the full version is considerably outnumbered in circulation by demonstration versions. Conversely, if a distributor later wants to re-invigorate sales by re-releasing the demo (for example on a magazine disk) then potentially the demo is outnumbered by retail versions. Finally, some considerable time after the retail release, only a few instances of either the full or demo version may still be in circulation.

Embodiments of the present invention recognise that such imbalances in distribution between the demo and retail versions of a game can be mitigated to improve the user experience of the smaller distribution group for certain categories of games.

In embodiments of the present invention, early adopters of the full retail game (including fans and reviewers) can advantageously capitalise upon the existing on-line population of demo players to enhance their on-line gaming experience, whilst conversely late adopters of a game who play an old demo can capitalise on the existing on-line population of full retail game players.

The relevant issue with on-line video games (for example, on-line first-person combat games such as Counter-Strike) is that the game experience is dependent upon finding a on-line game server that already has people playing on it and which has a sufficiently fast response time to make playing practical (this response time is referred to as 'ping' or lag'). For a game to be commercially successful, a critical mass of on-line players is generally required.

Some games mitigate this problem by central management of the available servers to balance supply with demand, whilst others provide computer-controlled non-player characters (called 'bots') to increase the apparent number of players. However, these solutions are generally regarded as poor, either because the limited number of servers are slow for some users, resulting in high ping rates and unresponsive play, or because the bots are either poor opponents or, conversely, too good; poorly programmed bots often fail to display natural behaviour such as seeking cover and so are not satisfying opponents, whilst simultaneously are highly accurate shots; this may give a statistical balance between human and computer-controlled kill rates, but is frustrating for the player to actually play.

Embodiments of the present invention appreciate that the population of users playing a free, widely distributed demo of a game may reach such a critical mass of on-line players before the population of users buying the full retail version of the game, and so enable the full retail version of the game and the demo version of the game to be played together online, thereby allowing the full retail version to capitalise on the established demo user base.

Various respective aspects and features of the invention are defined in the appended claims. Combinations of features from the dependent claims may be combined with features of the independent claims as appropriate and not merely as explicitly set out in the claims.

Embodiments of the present invention will now be described by way of example with reference to the accompanying drawings, in which.

In a summary example embodiment of the present invention, an entertainment device such as a personal computer or a Sony® Playstation 3® entertainment device is loaded with a full retail version of a game. When run, the game presents the user with a list of servers ranked by ping and/or population, and marked to indicate whether they are supporting the full game or a demo version. In the event that the user decides to play on a server hosting demo players (for example because the server has an appreciably faster ping or is better populated than others), the full retail version of the game limits itself to implement only those features that are available in the demo version. For example, this may include limiting the size of the navigable environment, or limiting the number or type of in-game resources accessible (such as weapons, sound effects, character classes or factions) so as to conform with the in-game characteristics of the demo version. The components compatible with the demo version can be identified by an in-file flag, by reference to a database or table within the game, by reference to a configuration file or by data transmitted from a server. Multiple demo profiles can be encoded in this way if multiple demo versions are released.

In addition to allowing the user to take advantage of the population of demo players for on-line gaming, this also encourages word-of-mouth recommendation of a game; if a first person has a full retail version of a game and enthuses about it to a friend, that friend can download a free demonstration version of the game which they can play with the first person. This will encourage the friend to also buy the game so they can play the game together fully.

Figure 1:
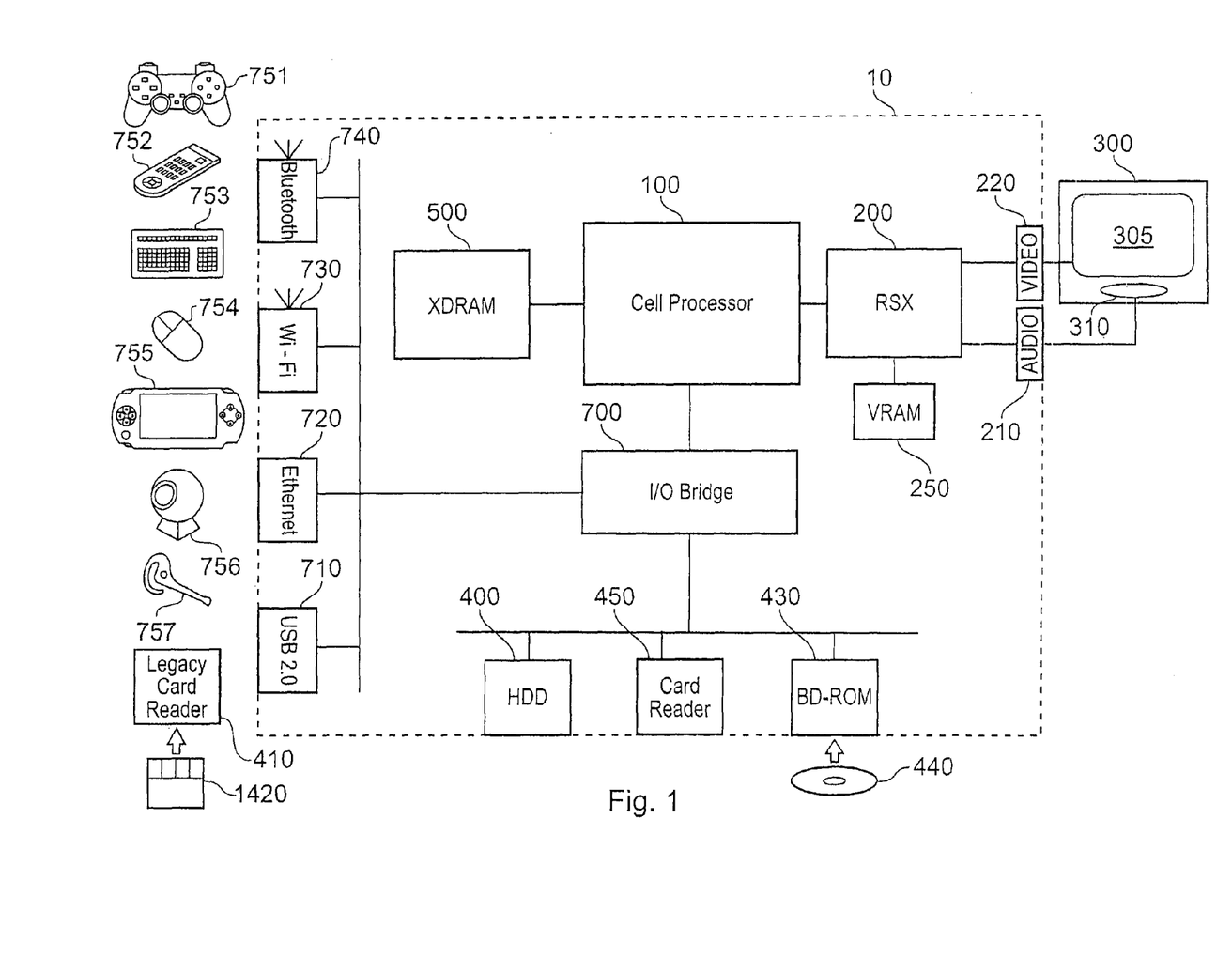
FIG. 1 is a schematic diagram of an entertainment device.

Referring now to FIG. 1, in an embodiment of the present invention, the entertainment device is a Sony® Playstation 3® (PS3®). FIG. 1 schematically illustrates the overall system architecture of the Sony® Playstation 3® entertainment device; a system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting of up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
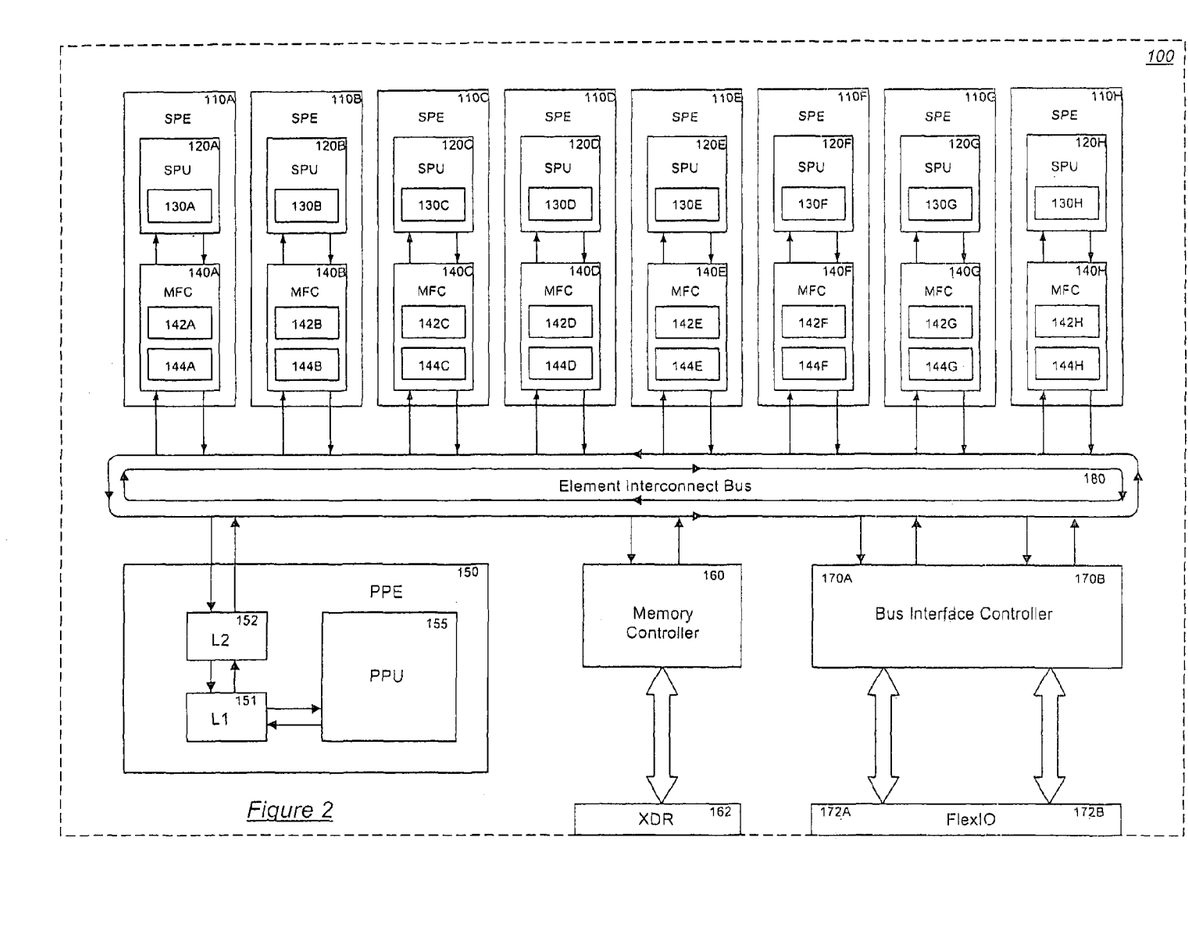
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totalling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96 B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
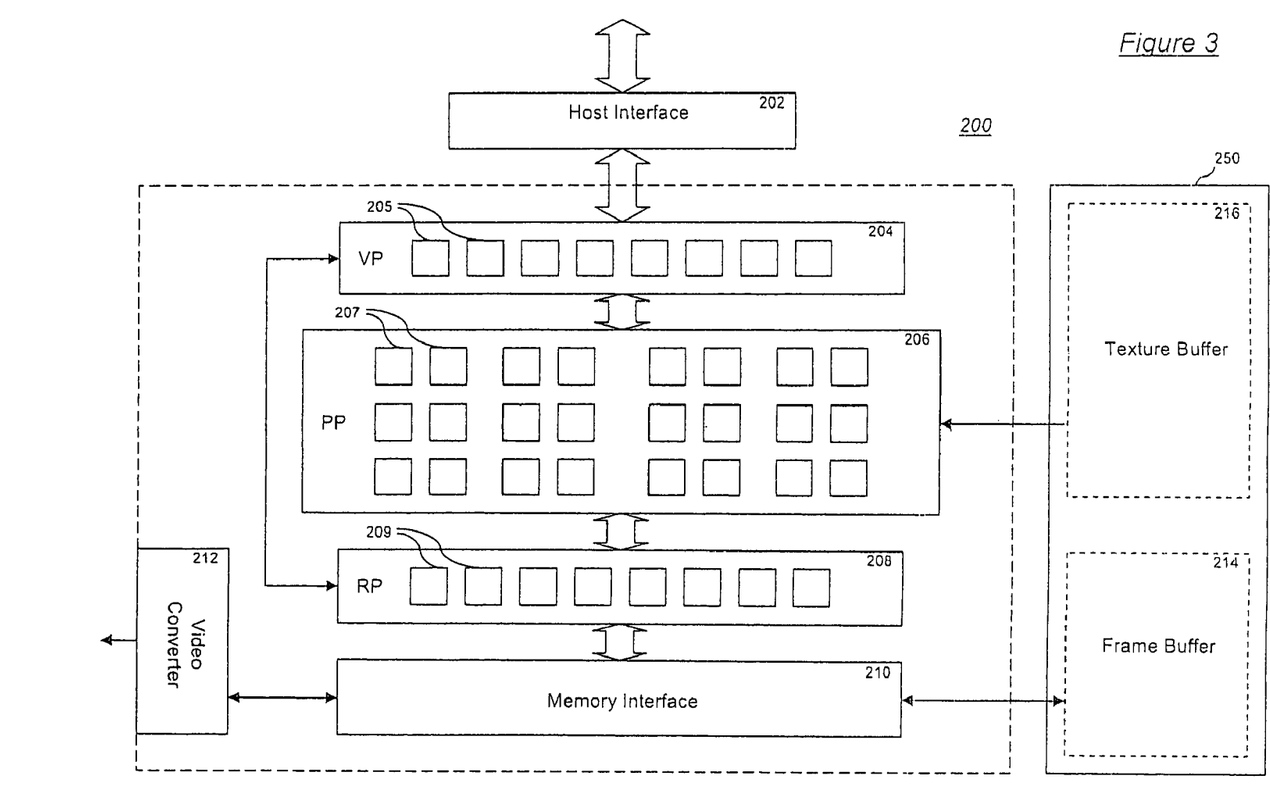
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively to disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 4:
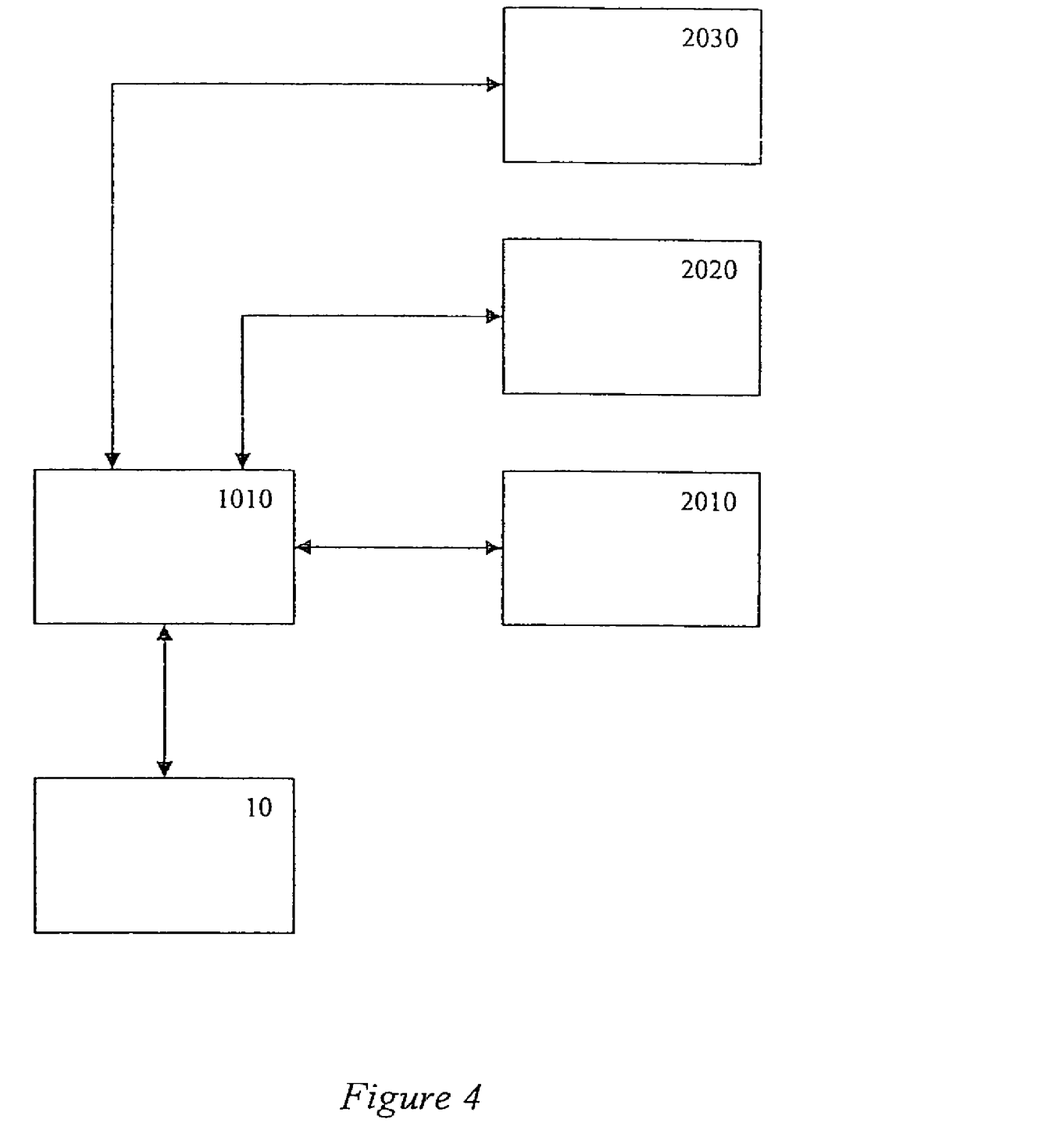
FIG. 4 is a schematic diagram of an on-line multiplayer games system in accordance with an embodiment of the present invention.

Referring now to FIG. 4, a Playstation 3 system unit 10, running a full retail version of a game 3000 (shown in FIGS. 5A and 5B), is connected to an on-line server 1010. Additional Playstation 3's 2010, 2020 and 2030 are also connected to the on-line server, and are running a demo version of the game 3000. It will be appreciated that more or fewer Playstations may be connected to the server at any given time and that three is for illustration purposes only.

The server 1010 hosts a demo version of the game server, and the Playstations running the demo of the game connect and play online in a conventional manner.

Figure 5A:
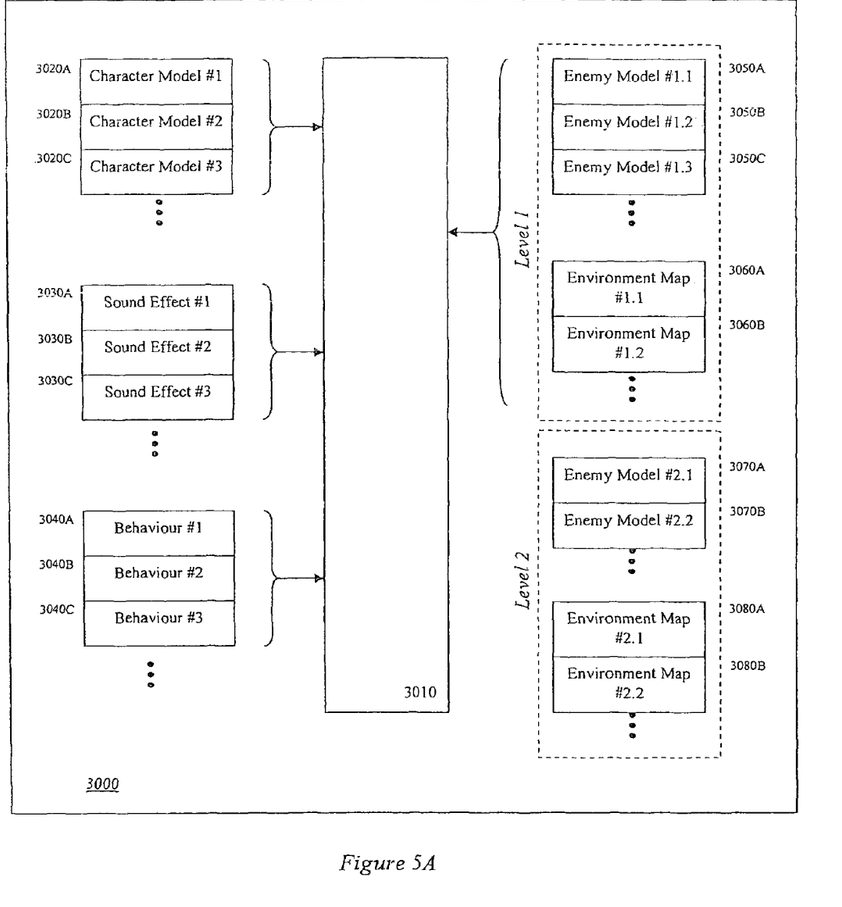
FIG. 5A is a schematic diagram of a game engine in accordance with an embodiment of the present invention.

Referring now also to FIG. 5A, the game 3000 comprises a game engine 3010. This is the main game executable, and typically comprises means to instruct a graphics processor to render a scene, means to selectively load resources required to generate such a scene, means to update computer controlled components of the scene (such as non-player characters, objects subject to physics simulation and the like) and means to update player controlled components (such as the player character) via a user input such as controller 751.

The resources selectively loaded to generate a scene in turn typically comprise general resources common to all levels, such as player character models 3020 A-C, generic sound effects 3030 A-C, and character behaviour information (such as scripted facial expressions, lip-sync data, and limb animation for the character model) 3040 A-C. In addition to these resources, level-specific resources are loaded, such as models for enemies specific to or featured in that level 3050 A-C and 3070 A-B, and environment maps and textures that provide the background environment (e.g. a cityscape, woodland, etc) 3060 A-B, and 3080 A-B. Generally, levels are loaded as required, and optionally environment maps for a given level may be loaded in sections to reduce memory usage.

Other resources will be apparent to a person skilled in the art, such as level-specific sounds, level-specific graphics shaders to implement a certain visual effect, and level specific character behaviour, such as movement paths to define where enemies can run within the environment, or scripted interactions between player or non-player characters. Other resources may include dynamic link libraries and other supplementary executable code associated with aspects of the game not included in the demo version.

Figure 5B:
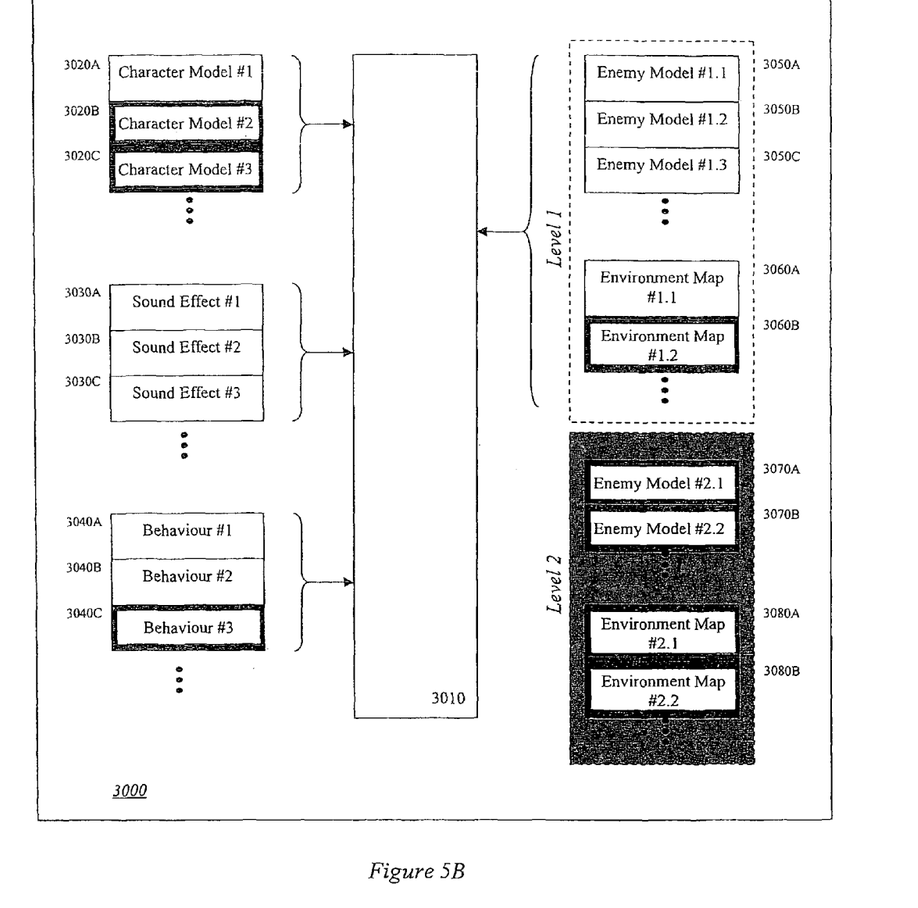
FIG. 5B is a schematic diagram of a game engine in accordance with an embodiment of the present invention.

Referring now to FIG. 5B, in an embodiment of the present invention resources are selectively loaded on a conditional basis; dependent upon whether they are also available to the demo version of the game.

In the example of FIG. 5B, when Playstation 3 system unit 10 running the full game connects to a server hosting the demo version of the game, only character model #1 3020A is loaded (for example because the demo version only features one of three factions that the player can belong to). As a result, a character animation/behaviour 3040C unique to one of the unused character models is also not required.

Continuing the example, the demo version of the game only supports (for example) the first part of the first level of the game. This first part features all the enemy model types 3050 A-C of that level, but only requires that the first part of the environment map 3060A is used. It will be appreciated that for other game types that do not follow a structured progression of levels, (for example games similar to Counter Strike), where instead a selection of maps are available for use in each game instance, then only those maps supported by the demo version will be selectable.

In an embodiment of the present invention, the conditional selection of a subset of the full game resources normally used can take the form of not loading such resources into the game engine (or not associating them with the engine where the engine merely coordinates the use of such resources by other dedicated processes such as those on a graphics card or sound card), and/or disabling their use once loaded or associated. The technique used may depend upon how the resources are encoded and stored (for example, separate files for each environment map may allow selective loading, whilst a single template image comprising several character textures may require that all are loaded, but are selectively used). It will be appreciated that a person skilled in the art, developing a game to be played in either demo or full mode, may suitably partition the resources to facilitate such a process. In the case that the game engine itself has been changed to accommodate additional functionality required by the full version of the game, this additional functionality will be conditional upon whether the game engine is operating in demo-or full-game mode.

In an embodiment of the present invention, identification of which resources of the full game are compatible with the demo version is provided by a loading script run by the game engine 3010. The loading script can take the form of program code that contains explicit instructions to load or otherwise operate upon game resources (e.g. associate textures with graphics hardware), in which case the instructions are made conditional upon whether the resource is compatible with the demonstration version, or alternatively the loading script is a sequence of file paths and other information that is parsed by the program, to which the additional information as to whether the resource represented by the file path is compatible with the demonstration version is added. Thus the loading script tells the game engine what resources are required when loading a level both when running as a full retail version and as a demo version. Alternatively, a separate loading script identifying only the resources compatible with the demo version may be used when compatibility with the demo version is required.

In an embodiment of the present invention, flags indicating compatibility with the demo version are incorporated within the resource data itself, and are checked for when following an otherwise conventional loading script.

In an embodiment of the present invention, a separate table listing the resources and their compatibility with the demo version is provided and is checked against as a standard loading script is run. Optionally, this table is downloaded from or augmented by the server to which the Playstation 3 is connected, allowing additional resources to be identified (for example, some on-line games allow customisation of textures and sounds by the server host, which are downloaded to the client devices such as the Playstation 3 when the game connects to the server).

To reflect the changes made to the game, the user interface (for example, the start menu and configuration options) also conforms to which resources are compatible with the demo in a manner described above, either greying out or not presenting options that require resources incompatible with the demo (in the example above, this may result in being unable to select two of the three normally available character factions, and to only be able to select a subset of game maps).

It will be appreciated that different demos may be released that require different combinations of resources. Consequently multiple fields may be used in the loading script, table or resource data as appropriate to identify different demos.

It will be appreciated that where differently designed versions of the game are released with corresponding demos (for example, a version of a game released in Germany is likely to use non-human opponents and may omit some game elements in order to comply with national law), any compatibility issues between different releases of software, as opposed to full and demo versions of the same software release, are outside the scope of the present invention. Likewise, where versions of a game are released for different platforms (e.g. PC, Xbox 360®, Playstation 3®), any compatibility issues between the different platform releases are outside the scope of the present invention. However it will be appreciated that if a game is developed to be compatible across platforms, then in principal a full retail version of a game on one platform could interact with a demo version of the game on another platform in accordance with embodiments of the present invention as described herein.

It will be appreciated that over the lifetime of a game, often patches are issued to address various bugs, hardware compatibility issues and game-play issues that arise from the full release of a game. Likewise, occasionally pre-release modifications are made to the full retail version of a game in response to various bugs, hardware compatibility issues and game-play issues that arise from the demo release of a game. In some instances, a patch may change a portion of the full release game so that it is no longer compatible with the demo version of the game. In this case, either the pre-patch resources may be archived for use with a demo version, or the patch can update the resource compatibility list or flags used by the game as necessary.

In rare instances, a patch may change the protocol by which on-line games are played. This may render the full retail game totally incompatible with the demo version. However, in general developers seek to avoid such changes since unless all players of the full retail version of the game apply the patch, there will also be compatibility issues between patched and un-patched retail copies of the game.

A Playstation 3 system unit 10, running a full retail version of a game, will generally not interact with a demo version of the game running on another PS3 (2010, 2020, 2030) unless they are both interacting via a game server.

Online games are generally hosted by a server that co-ordinates player movement information between client machines during the game, sets global parameters defining the characteristics of the game such as game duration, and arbitrates the selection of the game environment where this is variable (e.g. a user can nominate a map for the next game, and others can vote for it, with the server implementing the majority decision). Servers for different games may operate differently, but will in some fashion co-ordinate the information required for each player to interact with the others present within the shared game environment.

In an embodiment of the present invention, the Playstation 3 system unit 10 searches for an appropriate server by accessing a master server list in a manner known in the art. The master server list is generally maintained by a master server hosted by the game's publisher, and lists the IP address of all registered servers. This list can be initially filtered (either by the server or the PS3) to only consider servers in the same geographical region (i.e. country) as the PS3. The PS3 then attempts to access each server to obtain information about its current state, and ranks the servers based on the results.

Typically a server is ranked according to its ping, or lag, which indicates how responsive the game will be when connected to the server—a high ping or lag makes accurate interaction with other players difficult. In addition, a server can be ranked by its occupancy level; if a game is configured to host up to 16 players on a map, for example, then a server with an occupancy above 10 is likely to be preferable to one with an occupancy of only a handful of players, as otherwise the map may feel empty and frequent interaction with other players may be hard to achieve. In addition, servers may also provide further information, such as the current map in play.

Enabling both demo and full retail versions of a game as described herein to play on the same server helps to boost average map occupancy, so that owners of the full retail copy of the game can take advantage of the existing online community of demo players, and vice-versa.

Of course, occasionally a user may specifically want to play in a configuration that is not supported by the demo (in the ongoing example herein, if they wanted to play as a member of a faction that was not supported in the demo, or on a map that was not available in the demo). In this case it would be desirable to demote or remove the demo servers from the rankings when searching for a server to connect to.

Thus in an embodiment of the present invention, in addition to ping and occupancy data, game servers indicate if they are hosting a demo version of the game. This information can be used to filter the ranking results to positively select servers supporting the full retail version of the game, even if they are further down the overall ranking list.

It will be apparent to a person skilled in the art that different methods of ranking may be employed. For example, a server that is hosting the full retail version of a game may be biased upward in the overall rankings. Further, the bias may be increased until a certain number of full-game servers are represented in the top 10 of the ranking list, thereby automatically providing the user with a clear choice of server types. Alternatively, parallel rankings for the full game and demo servers could be provided, again allowing simple comparison of occupation and ping for both versions of the game.

Demo versions and full retail versions of games that have an online, multiplayer component typically comprise the game itself and the server software, integrated within the game code. This allows any user to set their machine up as a server. Indeed in some cases the game architecture is based around a server model, with an integral game server used in an off-line mode (e.g. when the computer is not connected to on-line), so that the game's own computer controlled bots can 'log in' to the server to play with the user. This simplifies the game code by removing the distinction between local and remote players.

The motivation for packaging the server software with the demo or full retail versions of the game is to provide a large number of potential servers for users. Whilst the ranking system means that users in different geographical or network areas and different time zones will tend to congregate on a small percentage of these servers at any one time, it enables a greater level of redundancy, ubiquity of service, and lower average ping times overall.

A demo version of a game may in principle be capable of hosting a full retail version of the server, but the owner of the demo will therefore not be able to participate as a player themselves in some or all possible variants of the hosted game. Consequently in practice this is an unlikely scenario and demo versions of the game server are likely to only support the demo version online.

The full retail version of the game may operate as either a full retail server or a demo server. The preference may be set by the user, or the user may allow it to be set by the master server. In this case, servers inform the master server that they are on-line and report the composition of their on-line players. The master server can then determine if demand for either the demo version or full retail version of the game is being reflected in the distribution of servers. Alternatively or in addition, the server may switch modes according to who has joined it; if the first player to join is running a demo version of the game, then the server operates as a demo server. If more than a threshold percentage of players are running the full version of the game, then the server can offer to switch to the full retail format, and allow the current players to vote. Likewise, if the majority of players vote to play a version of the game requiring resources only available to the full retail version (e.g. a particular map), then the server can switch modes to the full retail version.

If a majority of players vote to move to the full retail version of the game or vote for a game option only available in the full retail version, then optionally the demo players can be moved as a group to another demo server via a server-to-server transfer protocol, in which the server polls other demo servers to determine which have sufficient occupancy to accommodate the players that need to move, and selects the one with the lowest ping. In general, this will therefore also mean a comparatively low ping for the players moving to the new server. Optionally the selection can be restricted to demo servers based on the demo version of the game, thereby eliminating the possibility of being voted off a second server.

Thus a variety of server configurations are possible: demo servers based upon demo software, demo servers based upon full retail software, and full servers based upon the full retail software. The demo servers based upon the full retail software can be so set until explicitly changed or on a per-session basis, by user preference, master server preference or player voting preference according to embodiment.

It will be appreciated that in addition to one device operating as a server on the internet, other variations exist such as operating on a local area network, or the devices communicating in a peer-to-peer fashion.

It will be appreciated that the full game server determines and utilises compatible resources in a similar manner to the full game.

It will also be appreciated that dedicated servers may exist separately to the game as a whole: the makers of the game may also run game servers, and these servers may comprise the server elements of the game for the full or demo versions. Moreover, these servers may not necessarily run on PS3s, but instead may, for example, be PC based. Thus in addition to a client, or end-user, version of the software (which may also contain server software itself as noted above), a dedicated server version of the software may be provided. However, the same principles still apply; the server code can in principle be a demo-only version, or a full version that can switch to act as a demo version in the manner described herein.

Figure 6:
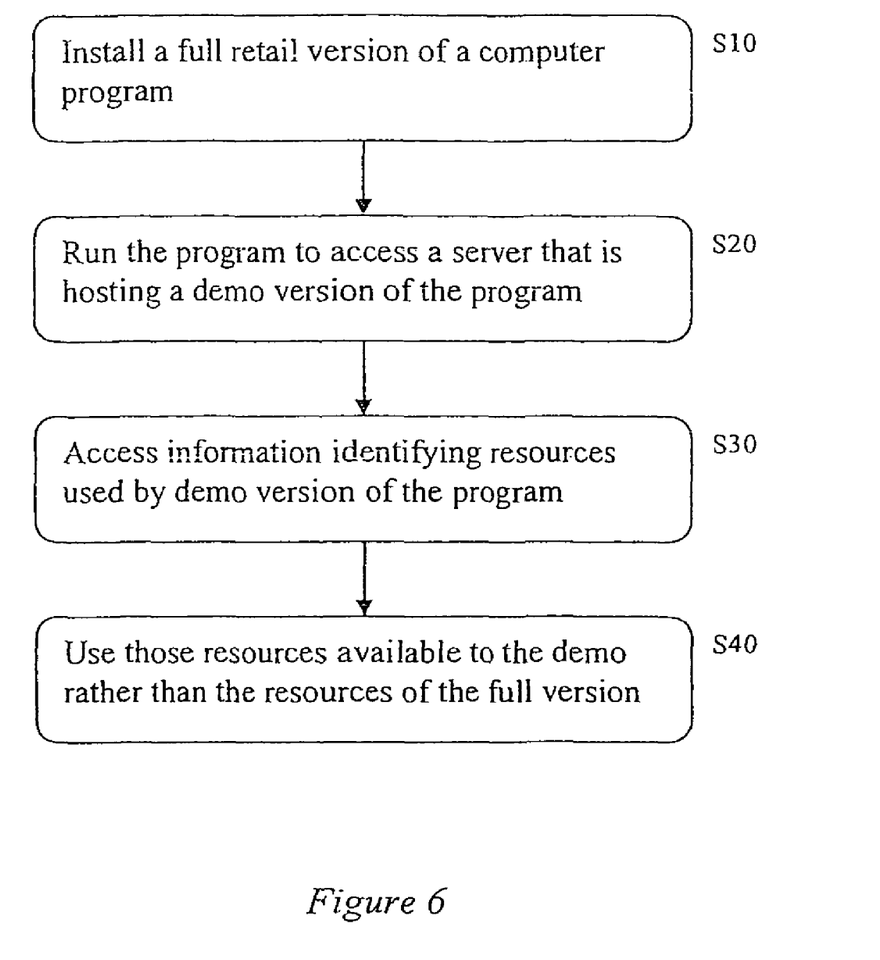
FIG. 6 is a flow diagram of a method of software interaction in accordance with an embodiment of the present invention.

Referring now to FIG. 6, a method of software interaction comprises a first step s10 of installing a full retail version of a computer program on a suitable computing device, such as the Playstation 3. In a second step s20, the Playstation 3, under the control of the computer program, accesses a server that is hosting a demo version of the software. In a third step s30, the computer program accesses a loading script or similar reference to determine which further resources for the computer program are required by the demo version, by analysing flags associated with these resources that indicate their presence in the demo version. In a fourth step s40, the computer program includes in its final, on-line configuration those resources compatible with the demo version, so enabling a user of the full retail version of the computer program to interact with a user of the demo version of the computer program, and vice-versa.

It will be appreciated by a person skilled in the art that variations in the above method corresponding to operation of the various embodiments of the apparatus disclosed above are considered within the scope of the present invention, including but not limited to:

generating rankings of servers responsive to whether the servers are running in full or demo modes;
  incorporating a server within the computer program that is able to change between full and demo modes; and
  such servers reporting whether they are in full or demo mode when contacted by a client device.

It will also be appreciated that in embodiments of the present invention, elements of the method of software interaction, and implementations of the operating apparatus, may be implemented by the reprogramming or one or more processors within one or more devices, such as one or more Playstation 3's acting as clients or servers. As such, the required adaptation to existing parts of a conventional equivalent device may be implemented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

The invention claimed is:

1. An entertainment device for running a game program available as both a demonstration version and a full version, the entertainment device comprising:
  a network communicator for communicating with a remote device over a network;
  program code and resources for running the full version of the game program and operable to interact with remote devices also running the full version of the game program, the game program providing, when executed by the entertainment device, game features corresponding to the program resources, the game features including one or more of game levels, game characters, non-player characters, game animations or visual effects, character behaviours, game sounds, environment maps and textures; and
  a program resource classifier for classifying which program resources are available to or compatible with the demonstration version of the game program;
  wherein the entertainment device is responsive to a determination that a remote device is running the demonstration version of the program code to restrict the use of program resources to those program resources identified by the program resource classifier as being available to or compatible with the demonstration version of the game program so that the game program does not present, or inhibits the use or selection of, game features corresponding to resources classified as incompatible with or unavailable to the demonstration version of game program, thereby conforming the operating characteristics of the full version of the game program to the operating characteristics of the demonstration version of the game program.

2. An entertainment device according to claim 1 in which the full version of the game program operates substantially as the demonstration version of the game program for the purposes of interaction with the demonstration version of the game program being run on the remote device.

3. An entertainment device according to claim 1 in which the program resource classifier comprises a loading script used by the game program to load or otherwise operate upon program resources, the loading script comprising an indication of whether each program resource is required by the demonstration version of the game program.

4. An entertainment device according to claim 1 in which the program resource classifier comprises a reference table comprising an indication of whether each program resource is required by the demonstration version of the game program.

5. An entertainment device according to claim 1 in which the program resource classifier comprises an indication embedded within each program resource as to whether that resource is required by the demonstration version of the game program.

6. An entertainment device according to claim 1, further comprising a remote device ranker, and in which
  one or more remote devices contacted by the entertainment device are ranked responsive to whether the one or more remote devices are running the full version of the game program or the demonstration version of the game program.

7. An entertainment device according to claim 1, in which the remote device is an entertainment device operating as a server.

8. An entertainment device according to claim 1, in which the remote device is another entertainment device communicating in a peer-to-peer fashion with the entertainment device.

9. An entertainment device according to claim 1, further comprising:
a server operable to host either a full retail version of a game program or a demonstration version of the game program; and
a server status reporter,
and in which;
the server status reporter is operable to report whether the server is currently operating as a full server or a demo server.

10. An entertainment device according to claim 1, in which the game program is a videogame.

11. A server, comprising:
a network communicator for communicating with a remote device over a network;
a processor implementing program code and resources and configured to run a full version of a hosted game program, the processor being configured to interact with remote devices running a full version of the game program, the game program providing, when executed by the entertainment device, game features corresponding to program resources, the game features including one or more of game levels, game characters, non-player characters, game animations or visual effects, character behaviours, game sounds, environment maps and textures;
the processor further implementing a program resource classifier for classifying whether program resources are available to or compatible with a demonstration version of the game program; and
a mode selector for selecting between full and demonstration versions of the game program,
and in which;
when the mode selector selects the demonstration version of the game program,
the processor implementing the program code hosted on the server only uses program resources identified by the program resource classifier as being available to or compatible with the demonstration version of the game program so that the game program does not present, or inhibits the use or selection of, game features corresponding to resources classified as incompatible with or unavailable to the demonstration version of the game program, wherein the operating characteristics of the full version of the game program conform to the operating characteristics of the demonstration version of the game program.

12. A server according to claim 11, in which the full version of the game program operates substantially as a demo version of the game program for the purposes of interaction with a demo version of the game program being run on the remote device.

13. A server according to claim 11, in which the full version of the game program hosted by the server is a full server version.

14. A server according to claims 11, in which the full version of the game program hosted by the remote device is a full client version.

15. A server according to claim 11, in which the mode selector comprises a user interface for selecting between full and demo modes.

16. A server according to claim 11, in which the mode selector comprises a receiver for receiving instructions from a master server as to whether to operate in full or demo mode.

17. A server according to claim 11, in which the mode selector comprises a receiver for receiving resource selection requests from remote devices, and a thresholder to determine whether a threshold level of such requests require operation in full mode.

18. A server according to claim 11, in which the mode selector comprises a thresholder to determine whether a threshold proportion of remote devices support the full version of the game program.

19. A server according to claim 11, comprising a network communicator for communicating with other servers, and in which
where the mode selector causes the server to switch from demo mode to full mode, the server is arranged to poll other servers currently operating in demo mode to determine whether the other servers have the availability to accommodate those clients of the server that only comprise a demo version of the game program, in order to transfer some or all of the clients together to one of the other servers.

20. A method of software interaction, comprising the steps of:
installing a full version of a computer game program on a suitable device, the game program being implemented by a processor of the suitable device, the game program providing, when implemented by the processor, game features corresponding to program resources, the game features including one or more of game levels, game characters, non-player characters, game animations or visual effects, character behaviours, game sounds, environment maps and textures;
the game program accessing a remote device that is hosting a demo version of the game program;
the processor, when executing the game program, accessing a program resource classification reference to determine which of the full set of resources available to the game program are required by the demo version of the program; and
the processor, when executing the game program, restricting the game program's use of the program resources in accordance with the program resource reference so as to interact with the demo version of the game program as if it were a demo version of the game program so that the game program does not present, or inhibits the use or selection of, game features corresponding to resources classified as incompatible with or unavailable to the demo version of the game program, wherein the operating characteristics of the full version of the game program conform to the operating characteristics of the demo version of the game program.

21. A method of software interaction according to claim 20, in which the step of accessing a program resource classification reference comprises accessing a loading script used by the game program to load or otherwise operate upon game program resources, the loading script comprising an indication of whether each program resource is required by the demonstration version of the game program.

22. A method of software interaction according to claim 20, in which the step of accessing a program resource classification reference comprises accessing a reference table comprising an indication of whether each program resource is required by the demonstration version of the game program.

23. A method of software interaction according to claim 20, in which the step of accessing a program resource classification reference comprises accessing an indication embedded within each program resource as to whether that resource is required by the demonstration version of the game program.

24. A method of software interaction according to claim 20, and further comprising the step of:
    ranking one or more remote devices contacted by the device in response to whether they are running a full version of the game program or a demonstration version of the game program.

25. A method of software interaction according to claim 20, in which the remote device is a device operating as a server.

26. A method of software interaction according claim 20, in which the remote device is another device communicating in a peer-to-peer fashion with the device.

27. A method of software interaction comprising the steps of:
    installing a full version of a computer game program on a suitable device acting as a server, the game program being implemented by a processor of the server;
    selecting a full version mode or demo version mode for running the computer game program, the game program providing, when implemented by the processor, game features corresponding to program resources, the game features including one or more of game levels, game characters, non-player characters, game animations or visual effects, character behaviours, game sounds, environment maps and textures;
    and upon selecting the demo version mode,
    the processor, when executing the game program, accessing a program resource classification reference to determine which of the full set of resources available to the game program are required by the demo version of the game program;
    the processor, when executing the full version of the game program, restricting the full version's use of the program resources in accordance with the program resource reference so as to interact with remotely connected devices running the demo version of the game program as if the full version of the game program were the demo version of the game program so that the game program does not present, or inhibits the use or selection of, game features corresponding to resources classified as incompatible with or unavailable to the demo version of the game program, wherein the operating characteristics of the full version of the game program conform to the operating characteristics of the demo version of the game program.

28. A method of software interaction according to claim 27 in which the full version of the game program hosted by the server is a full server version.

29. A method of software interaction according to claim 27 in which the full version of the game program hosted by a remote device is a full client version.

30. A method of software interaction according to claim 27, in which the step of selecting a mode comprises generating a user interface for selecting between full and demo modes.

31. A method of software interaction according to claim 27, in which the step of selecting a mode comprises receiving instructions from a master server as to whether to operate in full or demo mode.

32. A method of software interaction according to claim 27, in which the step of selecting a mode comprises receiving resource selection requests from remote devices, and determining whether a threshold level of such requests require operation in full mode.

33. A method of software interaction according to claim 27, in which the step of selecting a mode comprises determining whether a threshold proportion of remote devices support the full version of the game program.

34. A non-transitory computer-readable medium having instructions stored thereon, the instructions, when executed by a processor, cause the processor to perform a method comprising the steps of:
    installing a full version of a computer game program on a suitable device, the game program providing, when implemented by the processor, game features corresponding to program resources, the game features including one or more of game levels, game characters, non-player characters, game animations or visual effects, character behaviours, game sounds, environment maps and textures;
    the game program accessing a remote device that is hosting a demo version of the game program;
    the game program accessing a program resource classification reference to determine which of the full set of resources available to the game program are required by the demo version of the game program; and
    the game program restricting the game program's use of program resources in accordance with the program resource reference so as to interact with the demo version of the game program as if the game program were a demo version of the game program so that the game program does not present, or inhibits the use or selection of, game features corresponding to resources classified as incompatible with or unavailable to the demo version of the game program, wherein the operating characteristics of the full version of the game program conform to the operating characteristics of the demo version of the game program.

35. A non-transitory computer-readable medium having instructions stored thereon, the instructions, when executed by a processor, cause the processor to perform a method comprising the steps of:
    installing a full version of a computer game program on a suitable device acting as a server, the game program providing, when implemented by the server, game features corresponding to program resources, the game features including one or more of game levels, game characters, non-player characters, game animations or visual effects, character behaviours, game sounds, environment maps and textures;
    selecting a full version mode or demo version mode for running the computer game program;
    and upon selecting the demo version mode,
    the game program accessing a program resource classification reference to determine which of the full set of resources available to the game program are required by the demo version of the game program;
    the full version of the game program restricting the full version's use of the program resources in accordance with the program resource reference so as to interact with remotely connected devices running the demo version of the game program as if the full version of the game program were the demo version of the game program so that the game program does not present, or inhibits the use or selection of, game features corresponding to resources classified as incompatible with or unavailable to the demo version of the game program, wherein the operating characteristics of the full version of the game program conform to the operating characteristics of the demo version of the game program.

* * * * *